Patented Aug. 10, 1943

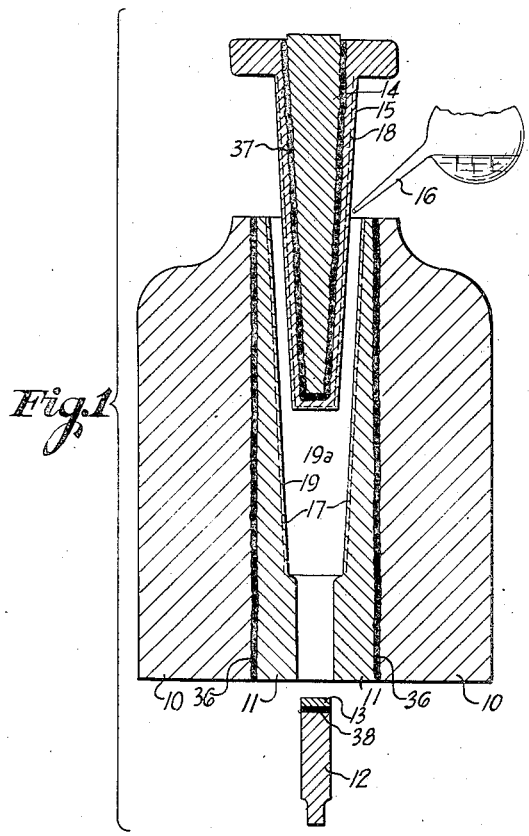
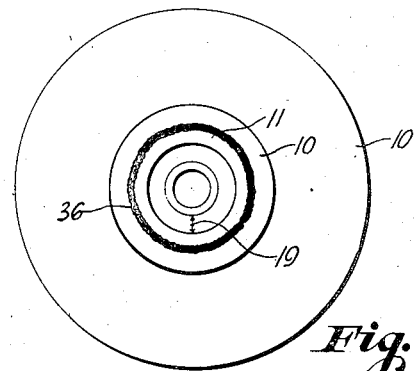
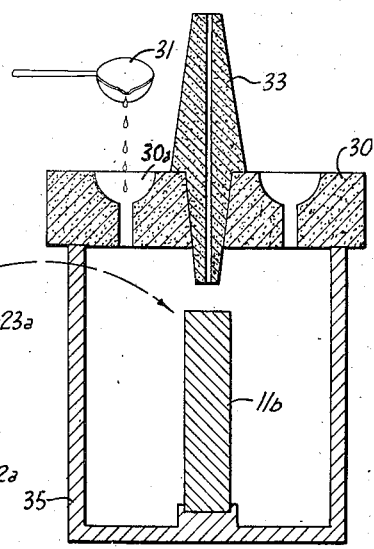
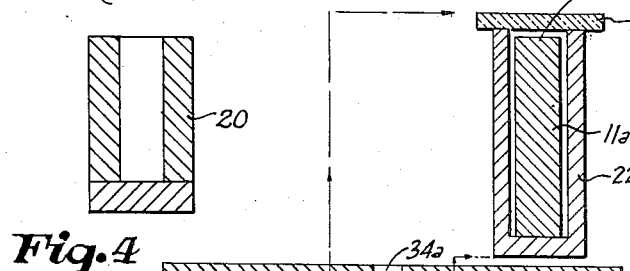
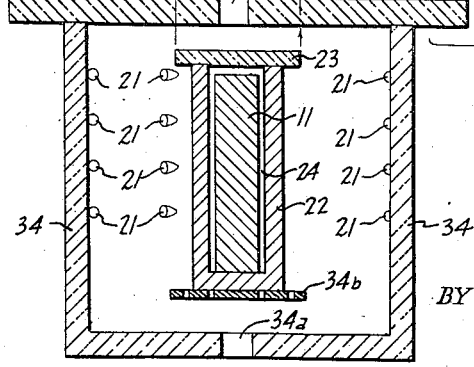
Fig. 1  Fig. 2  Fig. 3  Fig. 4
INVENTORS
John F. Kelly
William J. Kelly
BY William D. Hall
ATTORNEY.

2,326,730

UNITED STATES PATENT OFFICE 2,326,730

MOLD AND METHOD OF MAKING THE SAME

John F. Kelly and William J. Kelly, Elkins, W. Va.

Application September 18, 1939, Serial No. 295,551

4 Claims. (Cl. 49—65)

This invention relates to bimetallic constructions wherein two metals are united together and to the process of making such constructions. More specifically, the invention relates to glass molds and to the method of making as well as using such molds.

The primary object of this invention is to produce a low cost bimetallic construction having one surface thereof suited for glass molding work and in which the two parts of the construction are so fused together as to enable efficient transmission of heat from the cavity to the outer surfaces of the mold. Other objects of the invention will appear as this description proceeds.

In carrying out the above object, we use an inner layer of a chilled corrosion resistant cast iron which defines the cavity of the mold. The material used is preferably a nickel-iron alloy having a nickel content well above 20% although this particular alloy is not essential and our invention may be carried out with various heat resistant materials. During the manufacture of this mold, the nickel cast iron part is machined on its outer surfaces so it will be quite clean. It is essential to remove all foreign matter from this surface by a good cleaning process and we have found machining to be quite satisfactory. This part is then heated to 1600° F. in a non-oxidizing medium, transferred to a foundry mold in such a manner that its contact with the air is very brief, and then coated with a very thick layer of cast iron by the step of casting ordinary cast iron about the same. With our process, the ordinary cast iron fuses with the nickel-iron alloy part and thereby creates a very efficient heat flow path from the alloy part to the outer surfaces of the part composed of ordinary cast iron.

The present invention satisfies all the requirements of a good glass mold in that it provides a non-oxidizable molding surface as well as efficient heat dissipation from the molding cavity to the outer surfaces of the mold. Moreover, the new mold is inexpensive to manufacture, can be manufactured without appreciable probability of unreliable operation, and may be used several times for several different shapes of articles. As an example of this latter feature, we point out that after using the mold for producing articles of certain dimensions that the mold may be machined to a new shape thus enabling articles of other dimensions to be produced. The prior art has recognized that the surface of a glass mold must be free from oxidization, and both cast iron as well as pure nickel have been proposed as materials for such molds. With such limitations as cost, a nickel glass mold cannot be made thick enough so that its outer surface has enough area to effectively dissipate the heat. It has been proposed to cast a ring of iron around such a nickel insert, however, in absence of fusion between the cast iron and the nickel insert there would be considerable resistance to heat flow at the junction of the nickel and iron. The present invention contemplates a glass mold in which the inner stainless part is fused to the outer layer of cast iron, which outer layer is made very thick so it will have both a large external surface area and a large heat dissipating area. Such a glass mold characterizes the present invention, and we have found it to be a very marked improvement over glass molds known to the prior art.

A proposal that has been made by inventors of the prior art is to weld, by ordinary welding methods, a non-oxidizable coating upon an oxidizable metal but that proposal differs considerably from our invention and it also has certain disadvantages which do not occur with our process. Such prior art molds as we just mentioned are subject to the great disadvantage of being incompletely welded, the disadvantage of having air pockets at the joints, and they can ordinarily be built only when simple cavities are used. Accordingly, it is apparent that when the mold of our invention is compared with molds of the prior art such as the prior molds recited above, it is seen that we have made considerable improvements from the standpoints of: heat conductivity, cost, and surface characteristics.

A chilled cast iron makes a much better glass mold than does iron which was cast in a sand mold. When iron is cast against a chill, the metal surface of the chill mold conducts heat away from the hot iron causing the latter to cool rapidly. This makes the resultant casting uniform and dense. However, in casting a glass mold such as used by inventors of the prior art, it is impossible with usual casting methods to get the center or working section of the casting as dense as desired.

With this invention, an insert is cast against a chill and since this insert is relatively thin it becomes very dense throughout. With our process, an outer layer may be cast onto as well as fused to this insert without destroying the high degree of density of the insert. Hence, we can produce a glass mold which is very dense in its central working section. To avoid cracking the thin inner part or insert, it is desirable to use metals for both the inner and outer layers which have similar coefficients of thermal expansion as well as similar melting points.

In the drawing:

Figure 1 illustrates apparatus for manufacturing glass articles and includes a container of glass, a glass mold, a plunger, and a valve.

Figure 2 is a top view of the mold of Figure 1 without the plunger, valve, or a container of glass being shown.

Figure 3 illustrates apparatus that may be employed in carrying out the process which is claimed to be our invention.

Figure 4 is a sectional view of a chill mold that may be used for casting nickel-iron alloy inserts.

In Figure 1, an outer grey or white cast iron sleeve 10 surrounds and is fused to the inner nickel-iron alloy part 11. While this specification specifies that cast iron is used for layer 10, we recognize that any good heat conductor such as copper or aluminium may be used in forming layer 10 without departing from the very broadest aspects of our invention. The insert or inner part 11 defines a cavity 19a of a shape, for example, conforming to the outer surface of an ordinary drinking glass. The surface 19 of insert 11 is machined to such a shape.

A plunger is often used in glass manufacturing machinery and a suitable plunger is shown in Figure 1 directly above the mold cavity 19a. This plunger has a cast iron section 14 with an outer layer 15 of nickel-iron alloy cast iron fused thereto. The surface of layer 15 conforms to the shape of the inner side of the glass articles to be produced, for example, it may conform to the inner surface of said drinking glass. In addition to the mold and plunger, most glass manufacturing equipment of the type being considered employs a valve which in Figure 1 is shown directly below the mold cavity 19a. This valve has a white or grey cast iron base 12 with a nickel-iron alloy coating 13 fused thereto.

The method of manufacturing glass molds such as those shown in Figure 1 will now be described, reference being made particularly to Figure 3 although like parts on all figures are represented by like numbers.

An alloy insert 11, of suitable stainless metal such as the alloys described elsewhere in this disclosure, is first cast in a cylindrical chill mold 20 having thick chill walls. The cavity 19a may be cast into the insert originally or it may be machined into the insert immediately after the casting step is completed. Preferably, however, the cavity 19a is machined into the mold as the last step in the production of the mold.

After being cast, the outer surface wall of insert 11 is thoroughly cleaned, preferably by machining the outer part of this insert. Any cleaning method that thoroughly cleans the outer surface of part 11 will be within the teachings of this disclosure, however. After being cleaned, the insert is then covered with a coating of lampblack, or it may be smoked by the smoke from an acetylene torch. This coating is placed on the outer surface of the part 11 to prevent the part from being oxidized by subsequent steps of the process. Instead of coating the part 11 with lampblack, it may be coated with copper by electroplating. The insert 11 is then placed in chamber 22 which chamber is only slightly larger than the insert 11. This chamber may have a charcoal lining but this is not necessary. A removable cement lid 23 is placed on chamber 22. The chamber 22 is then placed in a gas furnace 34 of any suitable type but preferably a furnace in which a large number of jets 21 emerge tangentially from the inner surface of the furnace 34. The jets 21 are so arranged that a smooth band of flames exist for a distance of about three inches from the inner wall of furnace 34. The overall diameter of the furnace is three to five feet. The jets all face in the same angular direction and propel the flames around the inner wall of the furnace. The hot gases pass out the openings 34a respectively located at the top and bottom of the furnace 34. As a result, the flames and hot gases act on all sides of chamber 22 forcing heat evenly into this small chamber to such an extent that insert 11 is evenly heated to a temperature well above red heat and preferably to a temperature above 1600° F.

When sufficient times has elapsed for heat to fully penetrate the insert 11 to raise the same to say 1600° F. or slightly hotter, the entire small chamber 22 is removed to position 22a where it is adjacent the foundry mold 35. If the insert 11 were transferred to position 11a without using the chamber 22, the insert would oxidize slightly and impair the resultant glass mold. When at position 22a, the lid 23 is removed and the insert 11a removed and quickly brushed so as to remove the carbon which was deposited or smoked on the insert previously. In event the modified process is used wherein the insert is coated with copper it is not necessary to remove the coating. After being brushed, the insert 11 is placed in the foundry mold 35 at position 11b. The foundry mold 35 is then quickly assembled and ordinary grey cast iron poured into the cavities 30a of this foundry mold. A ladle 31 is used to supply the grey cast iron into the sand top 30 which defines the gate 30a. A vent 33 of dry sand core material is used to remove the hot gases from the molding chamber within 35. It is understood that the insert 11 is substantially at 1600° F. at the time the outer layer 10 is cast thereon by the process just outlined.

Since the nickel-iron alloy part 11 is the only part of our mold that comes into contact with the hot glass, it is not absolutely essential that foundry mold 35 have chill walls although it is desirable that it does. Ordinary sand walls will be satisfactory. The nickel-alloy part 11 has excellent heat and corrosion resistance yet a melting point approximately the same as ordinary cast iron. All of the iron alloy compositions described in detail in this disclosure have melting points between 1990° F. and 2280° F. and when such alloys are used in making insert 11, it is necessary to heat the insert to only about 1600° F. in furnace 34. The insert 11 is further heated on its outer surface by the hot cast iron coming into the foundry mold 35 and the temperature of the insert is thereby raised to the fusion point. Hence, the cast iron from ladle 31 thoroughly fuses with insert 11 and a wide band of alloy between the two is formed in the mold. This wide band is illustrated in Figure 1 and specifically designated by reference number 36 with respect to the mold, and 37 with respect to the plunger. With ordinary welding methods, alloying between the parts of the resultant mold would be restricted to a very narrow band and as a result the junction would be quite inferior to the junction of our invention wherein very intimate association of the parts 10 and 11 is effected. If an insert 11 is used which has a melting point higher than 2280° F., it is desirable to heat the insert 11 to a temperature well above 1600° F. before pouring iron from ladle 31. On the other hand, if an insert 11 should be used that has a very low melting point, perhaps little or no preliminary heating of it would be necessary.

We also recognize that the glass mold of Figure 1 can be manufactured by a modified process now to be described. The outer part 10 is first cast in the foundry mold 35 with a dry sand core at 11b instead of the nickel-iron alloy insert. The outer part 10 is then removed from the mold and the cavity which was produced by the core 11b machined so as to clean the inner surface thereof. The outer part 10 is then placed in the furnace 34 and heated almost to its fusion temperature at which time it is used as a mold and the nickel-alloy inner part 11 poured directly into the cavity of the part 10. This may be done while part 10 is still in the furnace 22 or it may be done after the part 10 is removed from furnace 22, but in any event it must be done while outer part 10 is hot. The cavity 19 is then machined into the inner part 11.

As shown in Figure 1, both the plunger and the valve may be of bimetallic construction. Either may be produced by the processes recited above. For example, the nickel-iron alloy piece 15 may be machined to shape from the cast state, heated to 1600° F., transferred to a mold in a suitable small chamber similar to chamber 22, and cast iron 14 poured thereinto. It is also apparent that part 14 may be cast first and part 15 later.

While the nickel-iron alloys contemplated by this invention are relatively stainless it has been found that after a time, in fact a rather long time as compared to ordinary glass molds, their surfaces become less efficient than the surfaces of new molds. When this occurs, the mold surface may be machined to new dimensions 17, and the plunger 15 may be machined to new dimensions 18. Further pouring of glass from 16 will produce glasses having a thick wall instead of a thin wall as originally.

As heretofore stated, the broadest aspects of this invention are not limited to any particular material for either the insert 11 or the outer part 10. Suitable materials are listed below. The preferred composition for the insert 11 is:

| Element | Preferred percentage | Minimum | Maximum |
| --- | --- | --- | --- |
| | | Per cent | Per cent |
| Carbon | 3.00 | 2.25 | 3.25 |
| Silicon | 2.00 | 1.00 | 3.00 |
| Manganese | 0.70 | 0.50 | 1.00 |
| Chromium | 3.50 | 0.00 | 6.00 |
| Nickel | 29.00 | 20.00 | 50.00 |
| Molybdenum | 1.00 | 0.00 | 2.00 |
| Usual impurities, balance iron. | | | |

The above alloy is suitable for use on the surface of the plunger as well as for use in insert 11. Another alloy suitable for either the insert 11 or the plunger surface 15 is:

| Element | Preferred percentage | Minimum | Maximum |
| --- | --- | --- | --- |
| | | Per cent | Per cent |
| Carbon | 2.50 | 1.50 | 4.00 |
| Chromium | 20.00 | 6.00 | 35.00 |
| Silicon | 1.25 | 1.00 | 3.00 |
| Manganese | 10.00 | 0.50 | 12.00 |
| Copper | (1) | 0.00 | 3.00 |
| Tungsten | (1) | 0.00 | 1.00 |
| Molybdenum | (1) | 0.00 | 1.00 |
| Balance is iron with usual impurities. | | | |

[1] Under 1%.

Another type of iron which may be used for either the insert 11 or the plunger surface 15 is:

| Element | Preferred percentage | Minimum | Maximum |
| --- | --- | --- | --- |
| | | Per cent | Per cent |
| Total carbon | 3.70 | 3.00 | 4.00 |
| Silicon | 2.10 | 1.00 | 3.00 |
| Nickel | 1.00 | 0.00 | 2.00 |
| Chromium | 0.10 | 0.00 | 1.00 |
| Molybdenum | 0.90 | 0.00 | 1.00 |
| Balance iron with usual impurities. | | | |

The above types of alloys as well as the ones listed below are all melted in a cupola according to standard foundry practice for these general types of irons and poured into permanent molds having thick metal chill walls.

The cast iron that is poured into the gating 30a of Figure 3, to form the outer layer 10 of Figure 1, and the iron used in making the section 14 illustrated also in Figure 1, has a preferred composition of total carbon 3.5%; and silicon 2.20%. The carbon content works well between the limits of 3.00 to 4.00% and the silicon may vary within the limits of 1.50% and 2.75%. The balance is iron with usual impurities. This latter iron may be used for the insert 11 and surface 15 but it is not as good as the other alloys for that use. It is quite satisfactory for the insert 11 and in fact a mold constructed according to our process, even with this type of iron for the insert, is superior to prior art molds inasmuch as our process enables us to thoroughly chill such a cast iron and thereby greatly improve its qualities above the qualities that would be obtained if such ordinary cast iron were used in any ordinary glass mold of the prior art.

Those skilled in the art understand that any of the cast irons disclosed above, as poured from the cupola, have large quantities of combined carbon but upon striking the chill mold precipitate most of this combined carbon into graphite. The graphite makes the iron uniform and dense. It is apparent that with our mold, the combined carbon is very efficiently changed to graphite adjacent our molding surface 19.

If our process produces the part 11 too hard for it to be machined, it may be suitably annealed to any desired degree.

We claim to have invented:

1. A device for producing glass articles comprising a part adapted to come into contact with molten glass on one surface thereof, said part being composed principally of iron having an alloying element therein in appreciable percentage adjacent said surface and in substantially less percentage at points in said part remote from said surface, that will render the metal substantially stainless.

2. A glass mold comprising a thin thoroughly chilled cast iron cylinder composed of:

| | Per cent |
| --- | --- |
| Carbon | 2.25 to 3.25 |
| Silicon | 1.00 to 3.00 |
| Manganese | 0.50 to 1.00 |
| Nickel | 20.00 to 50.00 |

Balance principally iron; and a thick outer sleeve surrounding the outer surface of said cylinder, intimately fused thereto, and composed of carbon 3.00 to 4.00%, silicon 1.50% to 2.75% with a balance that is principally iron.

3. An implement for forming molten glass adapted to be used with glass molding machinery for molding glassware, said implement being composed of a body of cast iron having fused thereto a glass engaging portion composed of:

| | Per cent |
|---|---|
| Carbon | 2.25 to 3.25 |
| Silicon | 1.00 to 3.00 |
| Manganese | 0.50 to 1.00 |
| Nickel | 20.00 to 50.00 |

Balance principally iron with impurities, said glass engaging portion also including chromium 0.01% to 6.00% and molybdenum in quantities between 0.01% and 2.00%.

4. A glass mold having a thoroughly chilled thin section glass engaging portion composed of 6 to 35% chromium, carbon 1.5 to 4.00%, silicon 1.0 to 3.00% and the balance principally iron.

JOHN F. KELLY.
WILLIAM J. KELLY.